United States Patent
Brier

(10) Patent No.: US 8,750,499 B2
(45) Date of Patent: Jun. 10, 2014

(54) CRYPTOGRAPHIC METHOD USING A NON-SUPERSINGULAR ELLIPTIC CURVE E IN CHARACTERISTIC 3

(75) Inventor: Eric Brier, Valence (FR)

(73) Assignee: Compagnie Industrielle et Financiere d'Ingenierie "Ingenico", Neuilly sur Seine (FR)

( * ) Notice: Subject to any disclaimer, the term of this patent is extended or adjusted under 35 U.S.C. 154(b) by 852 days.

(21) Appl. No.: 12/964,382

(22) Filed: Dec. 9, 2010

(65) Prior Publication Data

US 2014/0105384 A1    Apr. 17, 2014

(30) Foreign Application Priority Data

Jun. 16, 2010 (FR) .................................. 10 54783

(51) Int. Cl.
   *H04K 1/02* (2006.01)
(52) U.S. Cl.
   USPC ............ 380/30; 380/28; 380/270; 380/225; 705/75; 713/167
(58) Field of Classification Search
   USPC .................................. 380/30, 28, 255; 705/59
   See application file for complete search history.

(56) References Cited

U.S. PATENT DOCUMENTS

| | | | |
|---|---|---|---|
| 5,999,627 A * | 12/1999 | Lee et al. | 380/30 |
| 6,778,666 B1 * | 8/2004 | Kuzmich et al. | 380/28 |
| 7,200,225 B1 * | 4/2007 | Schroeppel | 380/28 |
| 8,019,079 B2 * | 9/2011 | Delgosha et al. | 380/30 |
| 8,559,625 B2 * | 10/2013 | Douguet et al. | 380/28 |
| 8,566,247 B1 * | 10/2013 | Nagel et al. | 705/59 |
| 8,619,972 B2 * | 12/2013 | Elmegaard-Fessel | 380/28 |
| 2006/0120528 A1 * | 6/2006 | Weng | 380/255 |

OTHER PUBLICATIONS

Lauter K, Advantages of elliptic curve cryptography for wireless security, Feb. 2004, vol. 11, pp. 62-67.*
Eric Brier et al., "Efficient Indifferentiable Hashing into Ordinary Elliptic Curves" 2009 XP009143991.
Jean-Luc Beuchat et al., "Algorithms and Arithmetic Operators for Computing the nt Pairing in Characteristic Three" Nov. 1, 2008, XP011230642.
Hisayoshi Sato et al., "An Efficient Method of Generating Rational Points on Elliptic Curves" Oct. 1, 2009, XP009144069.
Paulo Barreto et al., "Fast Hashing Onto Elliptic Curves Over Fields of Characteristic 3" Nov. 15, 2001, XP002541311.
French Search Report dated Feb. 14, 2011 for corresponding French Application No. 1054783, filed Jun. 16, 2010.

* cited by examiner

*Primary Examiner* — Cordelia Zecher
*Assistant Examiner* — Viral Lakhia
(74) *Attorney, Agent, or Firm* — David D. Brush; Westman, Champlin & Koehler, P.A.

(57) ABSTRACT

A cryptographic method is provided of a type with public key over a non-supersingular elliptic curve E, determined by the simplified Weirstrass equation $y^2=x^3+a \cdot x^2+b$ over a finite field $GF(3^n)$, with n being an integer greater than or equal to 1. The method includes associating an element t of said finite field with a point P' of the elliptic field. The step of associating includes: obtaining a pre-determined quadratic non-residue $\eta$ on $GF(3^n)$; obtaining a pre-determined point $P=(z_P, y_P)$ belonging to a conic C defined by the following equation: $a \cdot \eta \cdot z^{2-y^2}+b = 0$; obtaining a point $Q=(z_Q, y_Q)$, distinct from the point P belonging to the conic C and a straight line D defined by the following equation: $y=t \cdot z + y_P - t \cdot z_P$; obtaining the element $\xi$ of $GF(3^n)$ verifying the following linear equation over GF(3): $\xi^2 - \eta \cdot \xi = (\eta^2 \cdot z_Q)/a$; and associating, with the element t of the finite field, the point P' of the elliptic curve, for which the coordinates are defined by the pair $(\eta \cdot z_Q/\xi, y_Q)$.

5 Claims, 2 Drawing Sheets

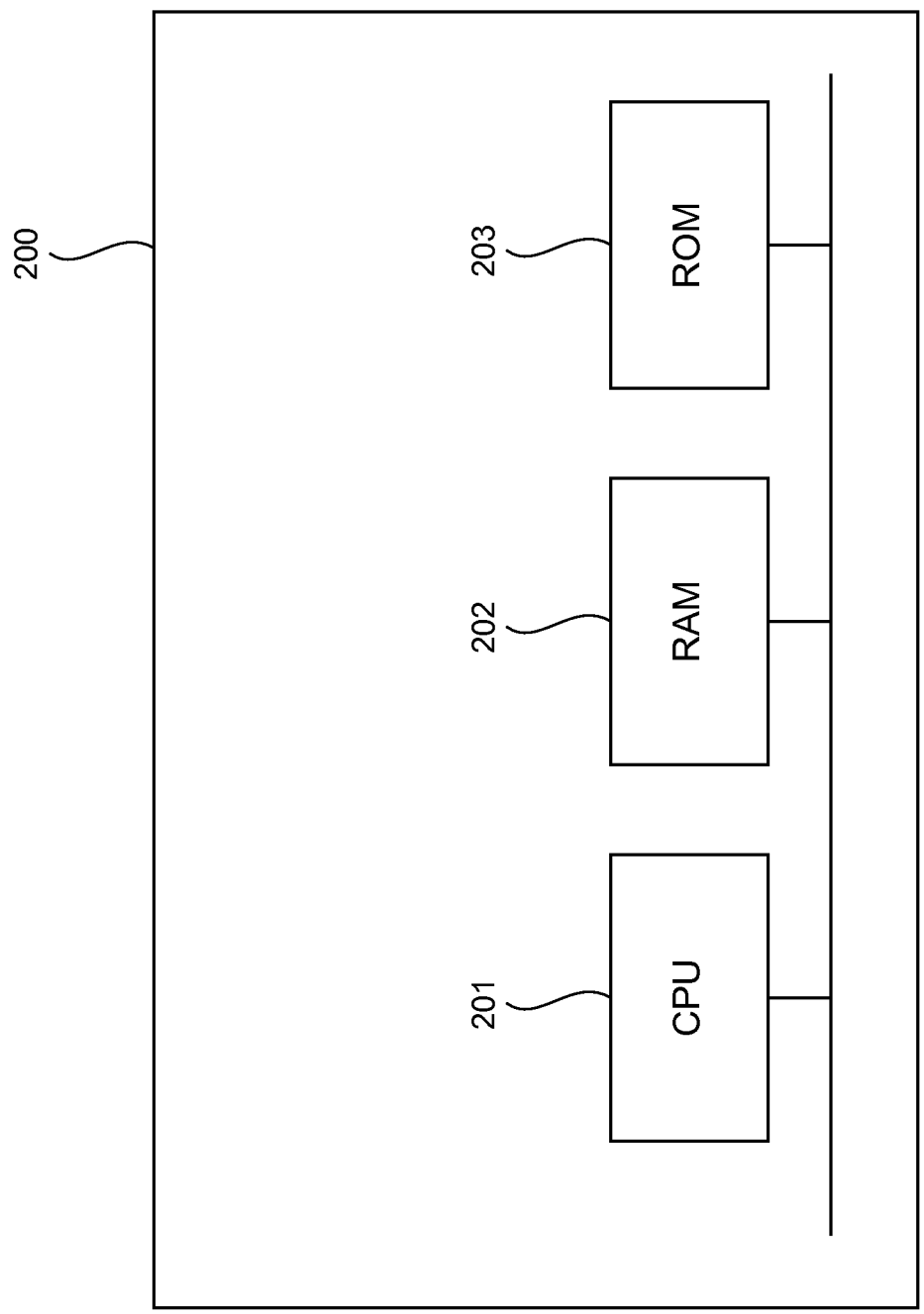

CRYPTOGRAPHIC METHOD USING A NON-SUPERSINGULAR ELLIPTIC CURVE E IN CHARACTERISTIC 3

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of cryptography.

More specifically, the disclosure pertains to the field of cryptosystems using elliptic curves.

The disclosure has many applications, for example in the field of embedded software, where the execution of an algorithm is sensitive to covert channel attacks.

More generally, it can be applied in every case where an attacker can have access to information on the running time of an algorithm.

TECHNOLOGICAL BACKGROUND

In 1984, Shamir proposed some schemes (an identity-based signature and encryption scheme) in the article "*Identity-based cryptosystems and signature schemes*" published at Crypto 84) based on the fact that a user's public key is directly related to the person's identity (for example his name, email address etc.). However, no mathematical tool could resolve the problems raised at the presentation of this research. Up to 2001, no instantiation of such a scheme had been found. At the Crypto 01 conference, Boneh & Franklin set up the first protocol, using special mathematical functions, namely pairings described in "*Identity-Based Encryption from the Weil Pairing*". These functions were initially used to carry out attacks (MOV and then FR attacks) on cryptosystems using elliptic curves with a low embedding degree, especially supersingular curves because the pairings make it possible to reduce the discrete logarithm problem defined on an elliptic curve to the discrete logarithm problem defined on a multiplicative group of a finite field where there is a sub-exponential algorithm available that can be used to resolve this problem in certain cases. Boneh & Franklin used these functions to obtain a concrete example (concrete both from the security viewpoint and from the practical viewpoint (at the implementation level)) of an identity-based encryption scheme. They achieved this instantiation by using a Weil pairing and, since then, many other types of pairings (Tate pairing, Ate pairing and Eta pairing) and schemes (encryption, signature, key exchange) have been proposed using these tools.

It must be noted that these schemes need to use a special hash function through which a point on an elliptic curve can be made to correspond to a given binary sequence (i.e. a succession of 0's and 1's). For example, in the article mentioned here above: "*Identity-Based Encryption from the Weil Pairing*", the MapToPoint function is used to convert a binary sequence (and identifier) into a point of the curve having a given order.

It must be noted that the group of an elliptic curve over a finite field is either cyclic or the product of two cyclic groups. It can be noted that when the cardinal of the set of points of the curve E, denoted as $\#E(GF(p^n))$, is a prime number, then the set of points of E forms a cyclic group and therefore all the points (except the point at infinity) are generators of the group E. Thus, a function making a binary sequence correspond to any point of the curve (other than the point at infinity) actually makes it possible to obtain a generator point of the group and this point therefore has the desired property. There are many techniques for building prime order curves (for example cf. Schmidt et al, "*Generating Elliptic Curves of Prime Order*", CHES, 2001, and Barreto et al. "*Pairing-Friendly Elliptic Curves of Prime Order*" SAC conference 2005).

It can be noted that the use of hash functions or conversion functions is found in other schemes (where the binary sequence represents a message or a password): the BLS signature scheme (cf. Boneh et al, "*Short Signatures from the Weil Pairing*", Asiacrypt 2001 conference), the SPEKE (Simple Password Exponential Key Exchange) protocol which is a zero-knowledge proof algorithm using the sharing of a password, enables the exchange of keys between two parties, (CF IEEE P1363.2 standard), the PEKS protocol ("Password Encryption Key", where a password or other identifying data is converted into points of a curve) as well as in the multiple-signature and aggregate-signature schemes.

In other schemes, it is not an identifier that has to be converted but a message (i.e. there are no constraints this time bearing on the order of the generated point). For example, the cryptosystem known as the Massey-Omura cryptosystem (U.S. Pat. No. 4,567,600), adapted to elliptic curves requires the use of such a function: indeed, when a message m is encrypted, the first step is that of representing this message m as a point M of the curve used.

In the prior art, there are several solutions to instantiating such hash functions (which are different from the MapToPoint function already referred to).

A first technique, which is a probabilistic technique, uses the following method proposed by Koblitz (set forth in W. Trappe et al, "*Introduction to Cryptography with Coding Theory*", chapter 16): given the elliptic curve E defined by the simplified Weirstrass equation $y^2 = x^3 + a \cdot x + b$ defined over a finite field GF(p), with p being a prime number strictly greater than three, the method comprises the following steps:

1. Express the message m as an element $m_i$ of the field GF(p). It may be noted that the probability that the element $m_i^3 + a \cdot m_i + b$ has a square root modulo p is ½.
2. Choose an integer k such that $(m_i+1) \cdot k < p$
3. For j from 0 to k−1,
compute $x_j := m_i \cdot k + j \mod p$,
Test to see whether $z_j := x_j^3 + a \cdot x_j + b$ possesses a square root modulo p; as soon as an element $z_j$ possesses a square root modulo p, the execution of the loop is stopped.
4. If j<k, then compute $y_j$ a square root of $z_j$ modulo p and make the point $(x_j, y_j)$ correspond to the message m. If not, it is not possible to make a point belonging to the elliptic curve E correspond to this message m.

Thus, the probability that this algorithm will not find any correspondence between a message m and a point on the curve E is $\frac{1}{2^k}$.

This algorithm can be adapted to finding a correspondence between a message and a point on an elliptic curve defined over a finite field $GF(p^n)$. A description of this algorithm can be found in the article by Muralidhara et al "*A Result on the*

*Distribution of Quadratic Residues with Applications to Elliptic Curve Cryptography*", Indocrypt conference 07.

A second technique, which is also probabilistic, is presented in the document D1 corresponding to the article by P. Barreto et al., "*Fast hashing onto elliptic curves over fields of characteristic* 3", which mentions two hash functions (the Map2Group$_h$ and Map3Group$_h$ functions), used to set up a correspondence, from a given elliptic curve defined over the finite field GF($3^n$), between any message m and a point M of this elliptic curve.

However, it can be noted that these techniques are sensitive to covert channel attacks (especially timing attacks carried out during the execution of these algorithms). This is because that these hash functions do not have a constant running time for, in each of these algorithms, there is a step for resolving an equation (a quadratic equation at the step 4 for the Map2Group$_h$ function and a cubic equation at the step 4 for the Map3Group$_h$ function) which does not necessarily allow for a solution. The algorithms reiterate the steps 2 to 4 so long as the equation does not accept any solution, which is the reason for the non-uniformity of execution in terms of time.

Several techniques have been proposed to mitigate this problem of non-uniformity in the running time of such a hash function. In particular, the first technique was proposed in the document D2, corresponding to the article by Shallue et al., "*Construction of rational points on elliptic curves over finite fields*" ANTS Conference 06, which uses Skalba's equality as well as a modification of the Tonelli-Shanks algorithm (used to extract square roots in a finite field). This algorithm has a complexity (in terms of running time) in $O(\log^3 p^n)$, when $p^n=3 \mod 4$, and if not in $O(\log^4 p^n)$ where the pairs (p,n) do not verify the above equality with p being a prime number strictly greater than 3.

The document D3, corresponding to the article by T. Icart, "*How to hash into elliptic curves*", CRYPTO Conference 09, proposes a second technique for building a hash function out of an elliptic curve defined over GF($p^n$) comprising a step for associating elements of GF($p^n$) with points belonging to the elliptic curve E, in deterministic time, with a complexity in $O(\log^3 p^n)$, when $p^n=2 \mod 3$ (thus, this technique can be applied to a bigger family of curves). In the document D4, corresponding to the article by Farashahi et al., "*On Hashing into Elliptic Curves*" in the "Journal of Mathematical Cryptology" December 2009, as well as in the document D5, corresponding to the article by Coron et al., "*An indifferentiable hash function into elliptic curves*" IACR, 2009, and the document D6, corresponding to the article by Fouque et al. "*Estimating the size of the image of deterministic hash functions to elliptic curves*" IACR eprint site 2010, the conjecture of the asymptotic formula introduced in the document D3 is refined and proven through the use of Chebotarev's density theorem. These documents therefore bring no relative improvement to the hash function building technique as such.

It may be noted that the deterministic hash functions of the documents D2 and D3 cannot be used to make messages correspond to points of a curve defined on a field of characteristic 3. Now the curves defined in characteristic 3 are the subject of major research and applications (cf. for example Jean-Luc Beuchat et al., "*Algorithms and Arithmetic Operators for Computing the $\eta_T$ Pairing in characteristic Three*" IEEE Transactions on Computers, vol.57, No.11, November 2008 where a new hardware accelerator is proposed enabling the implementation of arithmetic on the finite field GF($3^{97}$) that is isomorphic to GF(3)[X]/($X^{97}+X^{12}+2$) where the $X^{97}+X^{12}+2$ is an irreducible polynomial in GF(3)[X]), and there is no non-probabilistic technique to process this case.

This means that it will be worthwhile to find a deterministic hash function for elliptic curves defined over GF($3^n$).

SUMMARY

One particular embodiment of the disclosure proposes a cryptographic method of a type with public key over a non-supersingular elliptic curve E, determined by the simplified Weirstrass equation $y^2=x^3+a \cdot x^2+b$ over a finite field GF($3^n$), with n being an integer greater than or equal to 1, the method comprising associating an element t of said finite field with a point P' of the elliptic curve. This method is remarkable in that this step of associating comprises:

obtaining a pre-determined quadratic non-residue $\eta$ on GF($3^n$);

obtaining a pre-determined point P=($z_P$, $y_P$) belonging to a conic C defined by the following equation: $a \cdot \eta \cdot z^2 - y^2 + b = 0$;

obtaining a point Q=($z_Q$, $y_Q$), distinct from the point P belonging to the conic C and a straight line D defined by the following equation: $y = t \cdot z + y_P - t \cdot z_P$;

obtaining the element $\xi$ of GF($3^n$) verifying the following linear equation over GF(3): $\xi^3 - \eta \cdot \xi = (\eta^2 \cdot z_Q)/a$;

associating, with the element t of the finite field, the point P' of the elliptic curve for which the coordinates are defined by the pair ($\eta \cdot z_Q/\xi$, $y_Q$).

The general principle of the disclosure therefore is that of preventing an attacker from obtaining information through the running time by providing a step of association with a running time that is deterministic. Indeed, each of the steps of the method is performed in deterministic time. It may be noted finally that the steps for obtaining the information may consist of the retrieval of already computed elements stored in a memory.

Advantageously, the step of obtaining the element $\xi$ of GF($3^n$) includes a computation step using the inverse of a matrix A, the elements of the matrix A being a function of the representation of the element $\eta$, and said matrix A is defined so that the following linear equation over GF(3), $\xi^3 - \eta \cdot \xi = (\eta^2 \cdot z_Q)/a$ is equivalent to a linear equation A·X=Y, with X representing coordinates of the element $\xi$ and Y representing coordinates of the element $(\eta^2 \cdot z_Q)/a$.

Thus, obtaining the element of $\xi$ verifying the equation $\xi^3 - \eta \cdot \xi = (\eta^2 \cdot z_Q)/a$ requires only few computation.

Furthermore, by preliminarily storing the inverse of the matrix A, the resolution of this equation, done in order to obtain the element $\xi$ is less complex (from the viewpoint of the number of computations that have to be made).

Advantageously, the method comprises steps for:

using a hash function on a message m represented by a sequence of bits:

converting the hashed message obtained into said element t of the finite field on which the elliptic curve is defined.

Thus, we obtain a hash function used to convert any message m into a point of an elliptic curve.

Another embodiment of the disclosure proposes a computer program product comprising program code instructions to implement the above-mentioned method (in any one of its different embodiments) when said program is executed on a computer.

Another embodiment of the disclosure proposes a non-transitory computer-readable storage means storing a computer program comprising a set of computer-executable instructions to implement the above-mentioned method (in any one of its different embodiments).

Another embodiment of the disclosure pertains to an electronic circuit adapted to implement a cryptographic algorithm of a type with public key over a non-supersingular elliptic curve E, determined by the simplified Weirstrass equation $y^2=x^3+a\cdot x^2+b$ over a finite field $GF(3^n)$, with n being an integer greater than or equal to 1, the electronic circuit comprising means for associating an element t of said finite field with a point P' of the elliptic curve. This circuit is remarkable in that the means for associating comprises:

means for obtaining a pre-determined quadratic non-residue $\eta$ over $GF(3^n)$;

means for obtaining a pre-determined point $P=(z_P, y_P)$ belonging to a conic C defined by the following equation: $a\cdot\eta\cdot z^2-y^2+b=0$;

means for obtaining a point $Q=(z_Q, y_Q)$, distinct from the point P belonging to the conic C and a straight line D defined by the following equation: $y=t\cdot z+y_P-t\cdot z_P$;

means for obtaining the element $\xi$ of $GF(3^n)$ verifying the following linear equation over GF(3): $\xi^3-\eta\cdot\xi=(\eta^2\cdot z_Q)/a$;

means for associating, with the element t of the finite field, the point P' of the elliptic curve, the coordinates of which are defined by the pair $(\eta\cdot z_Q/\xi, y_Q)$.

In another embodiment, the disclosure pertains to a smartcard reader comprising an electronic circuit of this kind.

BRIEF DESCRIPTION OF THE DRAWINGS

Other features and advantages of the disclosure shall appear more clearly from the following description, given by way of a non-restrictive and illustrative example, and from the appended drawings, of which:

FIG. 2 shows the structure of an electronic component used to implement a particular embodiment of the disclosure.

DETAILED DESCRIPTION OF ILLUSTRATIVE EMBODIMENTS

Figure 1:
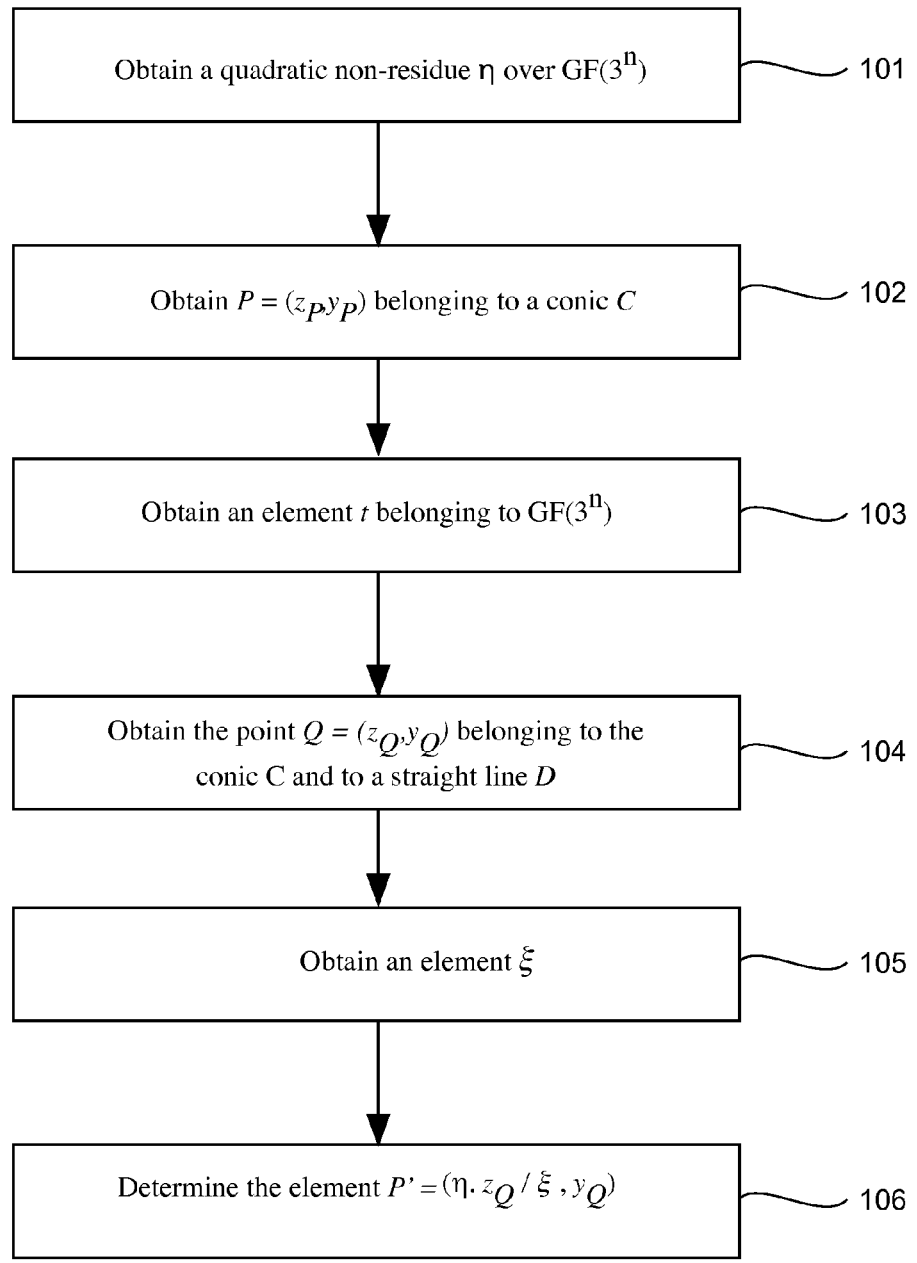
FIG. 1 is a flowchart of a particular embodiment of the disclosure.

In all the figures of the present document, the identical elements and steps are designated by a same numerical reference.

As a reminder, on a field of characteristic 3, denoted $GF(3^n)$ with n being an integer greater than or equal to 1, there are two types of Weierstrass equations used to define an elliptic curve: if the elliptic curve is a supersingular curve, then its equation may be put in the form: $y^2=x^3+a\cdot x+b$, and if the elliptic curve is non-supersingular, then its equation may be put in the form: $y^2=x^3+a\cdot x^2+b$.

The present disclosure applies only to non-supersingular elliptic curves.

In one embodiment of the disclosure, the counter-measures method is used to carry out a step of associating a message m, represented by a binary sequence of any unspecified size, with a point P' of the elliptic curve E, this being done in deterministic time.

This step of associating is described by the algorithm presented in FIG. 1, taking the following elements at input: a message m, the integer n enabling the finite field $GF(3^n)$ to be determined, the elements a, b belonging to $GF(3^n)$ enabling the definition of an elliptic curve E, the equation of which is the following: $y^2=x^3+a\cdot x^2+b$. The following is the detail of the algorithm (100):

Algorithm:

Step 1 (101): obtain a quadratic non-residue $\eta$ over the finite field $GF(3^n)$ (pre-computed so that all the steps are performed in constant time). Thus, this step can consist of the retrieval of such an element $\eta$ which has been pre-determined through the computation in which any unspecified element d belonging to $GF(3^n)^*$ is taken and $u:=(3^n-1)/2$ is determined and $w:=d^u$ in $GF(3^n)^*$ is computed; if w is equal to −1 then the element d is a quadratic non-residue and we define $\eta:=d$;

Step 2 (102): obtain a point $P=(z_P, y_P)$ belonging to a conic C defined by the following equation: $a\cdot\eta\cdot z^2-y^2+b=0$; This point P can be obtained following a probabilistic process. This is why this point must be pre-computed before execution of the step 2.

Step 3 (103): obtain $v=H(m)$ where H is a classic hash function (SHA-2, etc . . . ) and then convert this element v into an element of $GF(3^n)$ denoted as t;

Step 4 (104): determine the point $Q=(z_Q, y_Q)$ which is the point resulting from the intersection of the straight line D, passing through the point P, for which the equation is the following: $y=t\cdot z+y_P-t\cdot z_P$ and the conic C. This point Q, which is different from the point P, is unique to the means of application of the intersection theorem. Thus, the coordinates of the point Q can be expressed according to rational fractions in the parameters a, b, $\eta$ and t. To this end, it suffices to resolve the following system of equations:

$$y=t\cdot z+y_P-t\cdot z_P$$

$$a\cdot\eta\cdot z^2-y^2+b=0$$

which possesses two solutions corresponding to the coordinates of the point P and of the point Q.

Step 5 (105): determine the unique element $\xi$ of $GF(3^n)$ verifying the equation $\xi^3-\eta\cdot\xi=(\eta^2\cdot z_Q)/a$; since the element $\xi$ belongs to $GF(3^n)$, we can write $\xi=a_0+a_1X+\ldots+a_{n-1}X^{n-1}$, with $a_i$ belonging to GF(3). Thus, resolving the equation $\xi^3-\eta\cdot\xi=(\eta^2\cdot z_Q)/a$ is equivalent to determining the elements $a_0, a_1, \ldots, a_{n-1}$ defining the element $\xi$. Now, observing that $\xi^3=a_0+a_1X^3+\ldots+a_{n-1}X^{3(n-1)}=a_0'+a_1'X+\ldots+a_{n-1}'X^{n-1}$, then resolving the equation $\xi^3-\eta\cdot\xi=(\eta^2\cdot z_Q)/a$ is equivalent to resolving the following linear system: $A\cdot(a_0\ldots a_{n-1})^T=(b_0\ldots b_{n-1})^T$ where the elements of the matrix A (sized n×n) are determined as a function of the representation of the element $\eta$, and the elements $(b_0\ldots b_{n-1})$ are defined so that $b_0+b_1X+\ldots+b_{n-1}X^{n-1}=(\eta^2\cdot z_Q)/a$. Thus, in pre-computing the inverse of the matrix A, we obtain the elements $a_i$ and therefore we obtain a representation of the element $\xi$. This is achieved speedily in terms of running time and in relation to the complexity of the operations implemented.

Step 6 (106): determine the element $x=\eta\cdot z_Q/\xi$

Output_: the point $P'=(x, y_Q)$ which belongs to the elliptic curve E.

Indeed, the point $P'=(x, y_Q)$ does belong to the elliptic curve E because:

$$x^3+a\cdot x^2+b-y_Q^2=(\eta^3 z_Q^3+a\cdot\eta^2\cdot z_Q^2\cdot\xi-a\cdot\eta\cdot z_Q^2\cdot\xi^3)/\xi^3=(\eta^3 z_Q^3+a\cdot\eta\cdot z_Q^2\cdot(\eta\cdot\xi-\xi^3))/\xi^3$$

now $\xi$ has been chosen so that it verifies the following equation: $\xi^3-\eta\cdot\xi=(\eta^2\cdot z_Q)/a$ Thus in replacing $\xi^3$ by the numerator of the equation, the numerator turns out to be zero, thus proving that the point P' belongs to the elliptic curve E.

It may be noted that, at the step 5, the equation $\xi^3-\eta\cdot\xi=\tau$ generally possesses a unique solution for any value of $\tau$ of $GF(3^n)$. Indeed, assuming that this equation has two solutions, $\xi$ and $\zeta$, we would then have $\xi^3-\eta\xi=\zeta^3-\eta\cdot\zeta$, which can be factored into $(\xi-\zeta)\cdot((\xi-\zeta)^2-\eta)=0$. Now, since $\eta$ is a quadratic non-residue, the second factor is never at zero, and $\zeta=\xi$ is deduced from this. Having proved that the equation has at most only one solution for each value of $\tau$, we deduce from this, using the "pigeon hole principle", that it has exactly one root for each value of $\tau$.

Consequently, from the steps defined here above, we can define a function of association. This function of association is defined from a finite field $GF(3^n)$, with n being an integer greater than or equal to 1, an elliptic curve E put into the form of a simplified Weierstrass equation: $y^2=x^3+a\cdot x^2+b$, with a, b belonging to $GF(3^n)$, and a quadratic non-residue $\eta$ over $GF(3^n)$, and it is defined as follows:

$$F:GF(3^n) \rightarrow E$$

$$t \rightarrow (x, y_Q)$$

where the element $y_Q$ is obtained during the execution of the step 4, and the element $x=\eta\cdot z_Q/\xi$ with the element $z_Q$ and $\xi$ are obtained following the execution of the steps 4 and 5 and t is a $GF(3^n)$ element. Thus when a message, or any unspecified element u of $(0,1)^*$ has to be associated with a point of the elliptic curve E, a hashing step is performed: we determine $v=H(u)$ where H is a classic hash function (SHA-256, etc ...) and then the element v is converted into an element t of $GF(3^n)$. Finally, it can be noted that $F(0)=O$, the point at infinity which is the neutral element of the group of points of E.

In one particular embodiment, part or all of the steps of the algorithm are implemented by a set of computer-readable instructions forming a computer program, which is stored on a non-transitory computer-readable medium.

In another particular embodiment, part or all of the steps of the algorithm are implemented by an electronic circuit.

For example, FIG. 2 presents the structure of an electronic component used to implement a particular embodiment of the disclosure. The electronic component or device 200 has a random-access memory (or RAM) 202, which works as the main memory of a central processing unit (CPU) 201. The capacity of this random-access memory 202 can be extended by an optional random-access memory connected to an expansion port (not shown in FIG. 2). The device 200 also has a read-only memory (or ROM) 203. After being powered on, the central processing unit 201 is capable of executing instructions contained in a random-access memory 202 and pertaining to a computer program, once these instructions have been loaded from the read-only memory 203 or an external memory (not illustrated in the present figure). Such a computer program, if executed by the central processing unit 201, enables the execution of part or all of the steps of the algorithm of FIG. 1, when the device is a smart-card reader.

In one alternative embodiment, the algorithm of FIG. 1 can also be implemented in hardware form in an FPGA (Field Programmable Gate Array) or ASIC (Application-Specific Integrated Circuit) type programmable electronic circuit component.

At least one embodiment of the disclosure provides a technique for obtaining a hash function that has a deterministic running time (and not a probabilistic running time) to make any unspecified message correspond to a point of a non-supersingular elliptic curve defined over a finite field of characteristic 3.

Although the present disclosure has been described with reference to one or more examples, workers skilled in the art will recognize that changes may be made in form and detail without departing from the scope of the disclosure and/or the appended claims.

What is claimed is:

1. A cryptographic method of a type with a public key over a non-supersingular elliptic curve E, determined by the simplified Weirstrass equation $y^2=x^3+a\cdot x^2+b$ over a finite field $GF(3^n)$, with n being an integer greater than or equal to 1, the method comprising the following steps performed by an electronic device:

associating an element t of said finite field with a point P' of the elliptic curve, wherein associating comprises:
obtaining a pre-determined quadratic non-residue $\eta$ on $GF(3^n)$;
obtaining a pre-determined point $P=(z_P, y_P)$ belonging to a conic C defined by the following equation: $a\cdot\eta\cdot z^2 - y^2 + b = 0$;
obtaining a point $Q=(z_Q, y_Q)$, distinct from the point P belonging to the conic C and a straight line D defined by the following equation: $y=t\cdot z+y_P-t\cdot z_P$;
obtaining the element $\xi$ of $GF(3^n)$ verifying the following linear equation over $GF(3)$: $\xi - \eta\cdot\xi = (\eta^2\cdot z_Q)/a$; and
associating, with the element t of the finite field, the point P' of the elliptic curve, for which the coordinates are defined by the pair $(\eta\cdot z_Q/\xi, y_Q)$.
using a hash function on a message m represented by a sequence of bits to produce a hashed message; and
converting the hashed message into said element t of the finite field on which the elliptic curve is defined.

2. The method according to claim 1, wherein obtaining the element $\xi$ of $GF(3^n)$ includes a computation step using the inverse of a matrix A, the elements of the matrix A being a function of a representation of the element $\eta$, and said matrix A is defined so that the following linear equation over $GF(3)$, $\xi - \eta\cdot\xi = (\eta^2\cdot z_Q)/a$ is equivalent to a linear equation $A\cdot X=Y$, with X representing coordinates of the element $\xi$ and Y representing coordinates of the element $(\eta^2\cdot z_Q)/a$.

3. A non-transitory computer-readable storage medium storing a computer program comprising a set of computer-executable instructions to implement a cryptographic method of a type with public key over a non-supersingular elliptic curve E, determined by the simplified Weirstrass equation $y^2=x^3+a\cdot x^2+b$ over a finite field $GF(3^n)$, with n being an integer greater than or equal to 1, the method comprising the following steps performed by an electronic device when executing the instructions:

associating an element t of said finite field with a point P' of the elliptic curve, wherein associating comprises:
obtaining a pre-determined quadratic non-residue $\eta$ on $GF(3^n)$;
obtaining a pre-determined point $P=(z_P, y_P)$ belonging to a conic C defined by the following equation: $a\cdot\eta\cdot z^2 - y^2 + b = 0$;
obtaining a point $Q=(z_Q, y_Q)$, distinct from the point P belonging to the conic C and a straight line D defined by the following equation: $y=t\cdot z+y_P-t\cdot z_P$;
obtaining the element $\xi$ of $GF(3^n)$ verifying the following linear equation over $GF(3)$: $\xi - \eta\cdot\xi = (\eta^2\cdot z_Q)/a$; and
associating, with the element t of the finite field, the point P' of the elliptic curve, for which the coordinates are defined by the pair $(\eta\cdot z_Q/\xi, y_Q)$;
using a hash function on a message m represented by a sequence of bits to produce a hashed message; and
converting the hashed message into said element t of the finite field on which the elliptic curve is defined.

4. An electronic circuit configured to implement a cryptographic algorithm of a type with public key over a non-supersingular elliptic curve E, determined by the simplified Weirstrass equation $y^2=x^3+a\cdot x^2+b$ over a finite field $GF(3^n)$, with n being an integer greater than or equal to 1, the electronic circuit comprising:

means for associating an element t of said finite field with a point P' of the elliptic curve, wherein the means for associating comprise:
means for obtaining a pre-determined quadratic non-residue $\eta$ over $GF(3^n)$;

means for obtaining a pre-determined point $P=(z_P, y_P)$ belonging to a conic C defined by the following equation: $a \cdot \eta \cdot z^2 - y^2 + b = 0$;

means for obtaining a point $Q=(z_Q, y_Q)$, distinct from the point P belonging to the conic C and a straight line D defined by the following equation: $y = t \cdot z + y_P - t \cdot z_P$;

means for obtaining the element $\xi$ of $GF(3^n)$ verifying the following linear equation over $GF(3)$: $\xi^3 - \eta \cdot \xi = (\eta^2 \cdot z_Q)/a$; and means for associating, with the element t of the finite field, the point P' of the elliptic curve, the coordinates of which are defined by the pair $(\eta \cdot z_Q/\xi, y_Q)$;

means for using a hash function on a message m represented by a sequence of bits to produce a hashed message; and means for converting the hashed message into said element t of the finite field on which the elliptic curve is defined.

5. A smart-card reader comprising an electronic circuit according to claim 4.

* * * * *

UNITED STATES PATENT AND TRADEMARK OFFICE
CERTIFICATE OF CORRECTION

PATENT NO. : 8,750,499 B2
APPLICATION NO. : 12/964382
DATED : June 10, 2014
INVENTOR(S) : Brier It is certified that error appears in the above-identified patent and that said Letters Patent is hereby corrected as shown below:

On the title page item [57], line 10, delete

" $a \cdot \eta \cdot z^{2} - y^{2} + b = 0$ "

and replace with
--$a. \eta. z^2 - y^2 + b = 0$--.

In the claims

Claim 1, column 8, line 12 delete
"; and"

and replace with
--;--.

Claim 1, column 8, line 16, delete
"."

and replace with
--;--.

Claim 3, column 8, line 49 delete
"; and"

and replace with
--;--.

Signed and Sealed this
Eighth Day of March, 2016

Michelle K. Lee
*Director of the United States Patent and Trademark Office*